United States Patent
Ramachandran et al.

(10) Patent No.: US 8,103,142 B2
(45) Date of Patent: Jan. 24, 2012

(54) PREVENTING DIELECTRIC BREAKDOWN IN OPTICAL FIBERS

(75) Inventors: Siddharth Ramachandran, Pittsburgh, PA (US); Andrew D Yablon, Livingston, NJ (US)

(73) Assignee: OFS Fitel, LLC, Norcross, GA (US)

( * ) Notice: Subject to any disclaimer, the term of this patent is extended or adjusted under 35 U.S.C. 154(b) by 355 days.

(21) Appl. No.: 12/525,332

(22) PCT Filed: Feb. 5, 2008

(86) PCT No.: PCT/US2008/053036
§ 371 (c)(1),
(2), (4) Date: Jul. 31, 2009

(87) PCT Pub. No.: WO2008/097958
PCT Pub. Date: Aug. 14, 2008

(65) Prior Publication Data
US 2010/0008664 A1    Jan. 14, 2010

Related U.S. Application Data

(60) Provisional application No. 60/888,114, filed on Feb. 5, 2007.

(51) Int. Cl.
*G02B 6/44* (2006.01)

(52) U.S. Cl. ............ 385/107; 398/28; 385/100; 385/27; 385/31

(58) Field of Classification Search ............... 385/25–31, 385/100–107, 123, 141, 15, 37, 42; 398/28
See application file for complete search history.

(56) References Cited

U.S. PATENT DOCUMENTS

| | | | | |
|---|---|---|---|---|
| 6,018,533 | A * | 1/2000 | Krivoshlykov | 372/6 |
| 7,343,098 | B2 * | 3/2008 | Gerwe et al. | 398/120 |
| 2008/0069506 | A1 * | 3/2008 | DiGiovanni et al. | 385/123 |

* cited by examiner

*Primary Examiner* — Ellen Kim
(74) *Attorney, Agent, or Firm* — San Han, Esq.

(57) ABSTRACT

When transmitting in higher-order modes (HOMs), the chances of dielectric breakdown in the bulk glass can be reduced by judicious selection of the mode of transmission. Since energy distributions in the HOM profile change with the mode order, one can calculate the peak intensity for any given HOM. Correspondingly, one can calculate whether any portion of the transmitted pulse will exceed the breakdown threshold for the optical fiber through which the HOM signal is being transmitted. Should the calculated energy exceed the dielectric breakdown threshold, another HOM with a lower peak intensity can be selected for signal transmission. Disclosed are systems and methods for selecting an appropriate HOM to reduce the likelihood of dielectric breakdown.

6 Claims, 8 Drawing Sheets

PREVENTING DIELECTRIC BREAKDOWN IN OPTICAL FIBERS

CROSS REFERENCE TO RELATED APPLICATIONS

This application claims the benefit of U.S. provisional patent application Ser. No. 60/888,114, filed 2007 Feb. 5, having the title "Higher Order Mode Amplifiers," which is incorporated herein by reference in its entirety.

Additionally, the following U.S. patent applications are incorporated by reference herein, as if expressly set forth in their entireties:

(a) U.S. patent application Ser. No. 11/606,718, filed on 2006 Nov. 30, by DiGiovanni et al.;

(b) U.S. patent application Ser. No. 11/230,905, filed on 2005 Sep. 20, by Nicholson et al.;

(c) U.S. patent application Ser. No. 11/105,850, filed on 2005 Apr. 14, by Ramachandran et al.;

(d) U.S. patent application Ser. No. 11/367,495, filed on 2006 Mar. 4, by Ramachandran et al.;

(e) U.S. patent application Ser. No. 11/487,258, filed on 2006 Jul. 14, by Fini et al.

Also, the following U.S. patent applications, which are being filed concurrently, are incorporated by reference herein, as if set forth in their entireties:

(f) Ser. No. 12/523,348, by DiGiovanni and Ramachandran, having the title "Sequentially Increasing Effective Area in Higher-Order Mode (HOM) Signal Propagation";

(g) Ser. No. 12/525,339, by Ramachandran, having the title "Pumping in a Higher-Order Mode that is Different From a Signal Mode";

(h) Ser. No. 12/525,122, by DiGiovanni, Ghalmi, Mermelstein, and Ramachandran, having the title "Segmented Gain-Doping of an Optical Fiber"; and (i) Ser. No. 12/525,124, by DiGiovanni and Ramachandran, having the title "Selectively Pumping a Gain-Doped Region of a Higher-Order Mode Optical Fiber"; and (j) Ser. No. 12/525,138, by DiGiovanni and Headly, having the title "Pumping in a Higher-Order Mode that is Substantially Identical to a Signal Mode."

FIELD OF THE DISCLOSURE

The present disclosure relates generally to optical fibers and, more particularly, to higher-order mode ("HOM") signal transmission in optical fibers.

BACKGROUND

Ever since silica-based optical fibers have been used for high-power lasers and amplifiers, there have been ongoing efforts to increase the power of the signal that is transmitted through the fibers. One limitation of high-power transmission is the onset of dielectric breakdown in the bulk glass, where the threshold for dielectric breakdown is a function of both the pulse duration and the pulse energy. Thus, as the intensity of the pulse increases, the likelihood of dielectric breakdown increases correspondingly. Given this problem, there exists a need in the industry for an approach to transmitting high-power signals while avoiding dielectric breakdown of the bulk glass.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2($a$) is a chart showing an example of conversion efficiency when a fundamental mode is converted to a large-mode-area (LMA) HOM.

FIG. 2($b$) is a chart showing the spectral characteristics of an example module that converts fundamental mode signals to HOM signals.

FIG. 3($a$) is a chart showing the effective area of an example HOM as a function of wavelength.

FIG. 3($b$) is a chart showing a correlation between wavelength-dependent dispersion and various example mode orders.

FIG. 5($a$) is a diagram showing a cross-section of an example fiber having an 86-micrometer inner cladding.

FIG. 5($b$) is a chart showing the refractive index profile of the fiber in FIG. 5($a$).

FIG. 5($c$) is a diagram showing a near-field image of a HOM signal propagating in the fiber of FIG. 5($a$).

FIG. 5($d$) is a chart comparing the actual signal profile of FIG. 5($c$) with a theoretical signal profile.

DETAILED DESCRIPTION OF THE EMBODIMENTS

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

As the power levels increase during high-power transmission of optical signals in optical-fiber-based systems, various nonlinear effects manifest themselves. One such effect is dielectric breakdown, which occurs when the local intensity of the pulse exceeds the threshold for dielectric breakdown in the bulk glass. This threshold is a function of both the pulse duration and the pulse energy. Typically, in higher-order-mode (HOM) signal transmission, the cross-section of the HOM signal profile exhibits multiple lobes. As such, there is a greater risk of the dielectric breakdown occurring due to a lobe that may carry only a small fraction of the pulse energy but may nevertheless have a high peak intensity.

Thus, when transmitting in HOMs, the chances of dielectric breakdown in the bulk glass can be reduced by judicious selection of the mode of transmission. In other words, since the energy distribution in the HOM profile changes with the mode order, one can calculate the peak intensity for any given HOM. Correspondingly, one can calculate whether any portion of the transmitted pulse will exceed the breakdown threshold for the optical fiber through which the HOM signal is being transmitted. Should the calculated energy exceed the dielectric breakdown threshold, another HOM with a lower peak intensity can be selected for signal transmission.

By way of introduction, the drive toward higher-power fiber lasers has been enabled primarily by the availability of high-brightness semiconductor pump lasers. Limitations in optical transmission include nonlinearities resulting from high intensities in the fibers. As such, recent efforts have focused on large-mode-area (LMA) fibers with effective mode areas in which intensities are lowered. LMA fibers having effective areas as large as 300 square micrometers are now commercially available.

However, even when scaling to larger areas, the signal becomes increasingly unstable (e.g., lossy and susceptible to division of energy into other modes) as the modal area of the fiber increases. The instability can, to some extent, be mitigated by propagating the signal in a single well-defined higher-order mode (HOM) in a LMA fiber that supports a plurality of guided modes. With reference to mode-coupling instabilities, transmitting in HOMs is inherently more robust than transmitting in the fundamental mode. As such, HOM signal transmission generally permits signal transmission or amplification in modal areas that exceed 3000 square micrometers, and the HOM signal transmission exhibits greater immunity to bend-effects than transmission in the fundamental mode.

The cross-sectional intensity profile of HOMs do not resemble the cross-sectional intensity profile of the fundamental mode. Thus, if one wishes to have a fundamental mode signal at both the input and the output, then one must employ mode-transformation techniques to convert the fundamental mode signal to a HOM signal, and vice versa.

This disclosure, along with the drawings, provides a detailed description of a system for transmission of HOM signals, along with various approaches to maintaining the peak intensity of the HOM signal below the dielectric breakdown threshold of the silica-based optical fiber.

Figure 1:
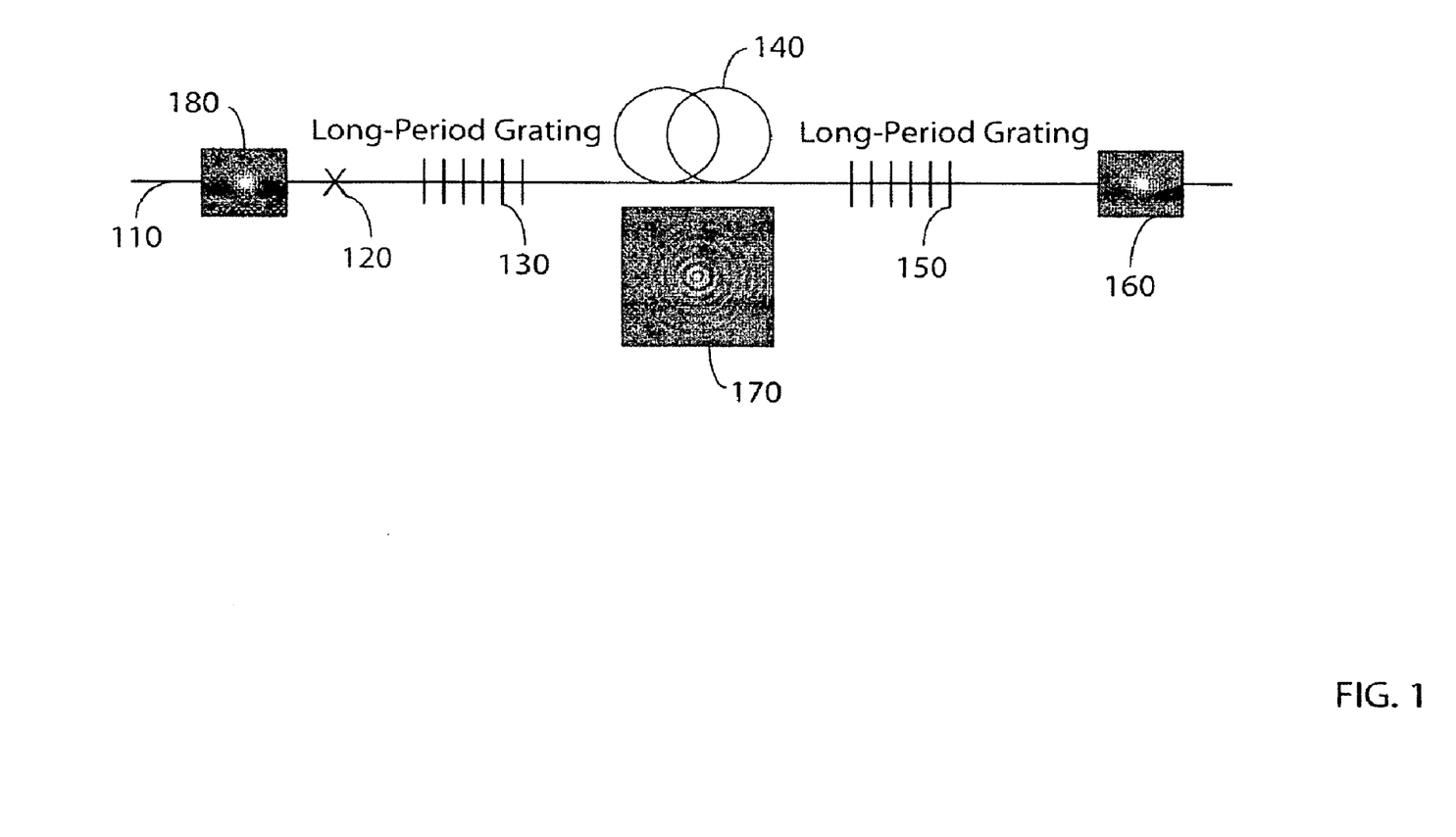
FIG. 1 is a schematic of an example setup for converting a fundamental mode to a higher-order mode (HOM).

FIG. 1 shows a schematic of one example setup, among others, for converting a fundamental mode signal 180 to a higher-order mode (HOM) signal 170, and amplifying the signal. In the embodiment of FIG. 1, the system comprises a single-mode fiber (SMF) 110 that is spliced or otherwise optically coupled to the input of a gain-doped ultra-large-mode-area (ULMA) fiber 140. Since gain-dopants, such as Erbium and Ytterbium, among others, are known in the art, further discussion of gain-dopants is omitted herein.

The ULMA fiber 140 has an in-fiber long-period grating (LPG) 130 that is specifically configured to convert the fundamental mode signal 180 to the HOM signal 170. Since such mode-conversion techniques are known in the industry, only a truncated discussion of the LPG 130 is provided herein. However, it should be appreciated by one having ordinary skill in the art that the fundamental mode signal 180 can be converted to the HOM signal 170 using other known mode-conversion techniques. At the output of the ULMA fiber 140 is another LPG 150 that is configured to convert the HOM signal 170 back to the fundamental mode signal 160.

Thus, in operation, the signal is introduced into the system as a fundamental mode signal 180, and converted into the HOM signal 170 by resonant coupling, using the in-fiber LPG 130. Once converted to the HOM signal 170 and sufficiently amplified by the gain-doped ULMA fiber 140, the amplified HOM signal 170 is converted back to the fundamental mode 160 by the second set of in-fiber LPG 150.

The stability of LMA fibers is largely governed by the extent to which random, distributed, resonant mode-mixing between the desired mode and its nearest anti-symmetric (or even) mode can be suppressed. For example, for $LP_{0m}$ modes, the stability is largely governed by its mode-mixing with its corresponding $LP_{1m}$ mode.

For the most part, this suppression depends on two primary factors. Namely, the purity of launch into the desired mode, and phase-matching between the two modes. Hence, as the difference between the effective indices ($n_{eff}$) of the two modes increases, the coupling between the desired mode and its corresponding anti-symmetric mode becomes increasingly inefficient.

Figure 4:
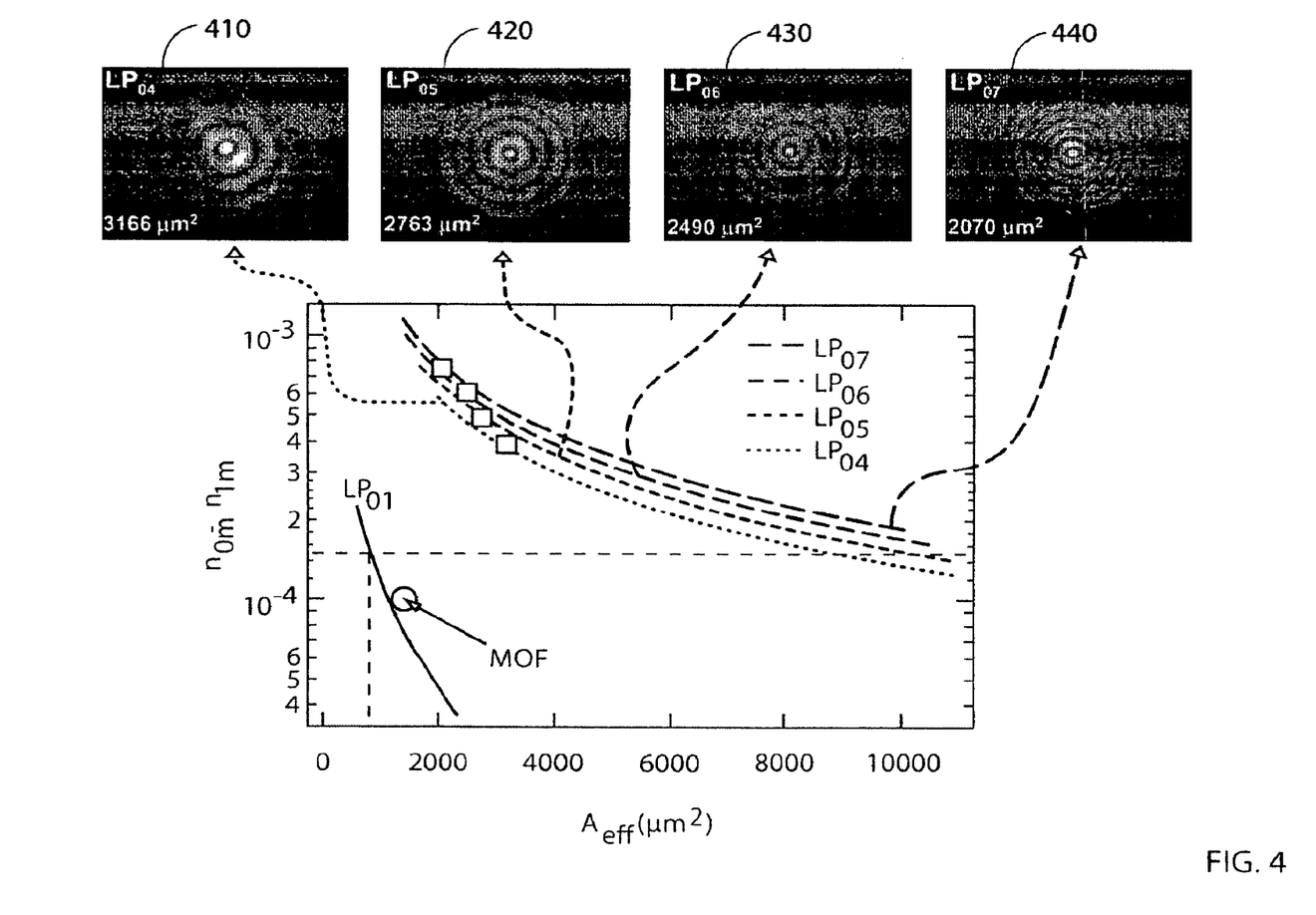
FIG. 4 is a chart showing a correlation between mode stability and choice of mode order.

FIG. 4 is a chart showing a correlation between mode stability and choice of mode order. The line designated as $LP_{01}$ illustrates the trade-off between stability and effective areas for the $LP_{01}$ mode of fibers. Generally, robust operation with conventional LMA fibers is limited to effective areas of approximately 800 square micrometers, since larger effective areas yield low enough $n_{01}$-$n_{11}$ values so that mode coupling becomes prohibitively high. In FIG. 4, the threshold for high mode coupling, for the 800 square-micrometer LMA fiber, is shown by the horizontal dashed line. Also depicted is a data point denoted "MOF," which illustrates the largest effective areas (approximately 1400 square micrometers) for micro-structured optical fibers as of 2005. Micro-structured optical fibers can be designed with large differential modal losses, which enables radiating out the $LP_{11}$ mode, thereby yielding higher modal purity at the output. Hence, these fibers can offer stable operation for cases with significantly lower $n_{01}$-$n_{11}$.

As shown in FIG. 4, HOMs permit substantial scaling of effective areas. While the stability (represented by $n_{0m}$-$n_{1m}$) of the HOMs ($LP_{04}$, $LP_{05}$, $LP_{06}$, and $LP_{07}$) degrades with an increase in effective area, the degree of degradation is significantly less than the degradation exhibited in the fundamental mode. Specifically, the $n_{0m}$-$n_{1m}$ values for the HOMs are an order of magnitude higher than those for the fundamental mode ($LP_{01}$). As such, the behavior of the HOMs evidence an ability of the HOMs to obtain stable, mode-mixing-free signal propagation with significantly larger effective areas than that which is achievable in the fundamental mode. Additionally, the $n_{0m}$-$n_{1m}$ values increase with modal order (denoted by the subscript "m"), indicating that this concept is substantially scalable.

FIG. 4 also shows experimentally-recorded near-field images for the modes $LP_{04}$ 410, $LP_{05}$ 420, $LP_{06}$ 430, and $LP_{07}$ 440. In the particular embodiment shown in FIG. 4, the $LP_{04}$ mode has an effective area of approximately 3200 square micrometers; the $LP_{05}$ mode has an effective area of approximately 2800 square micrometers; the $LP_{06}$ mode has an effective area of approximately 2500 square micrometers; and the $LP_{07}$ mode has an effective area of approximately 2100 square micrometers.

Figure 5:
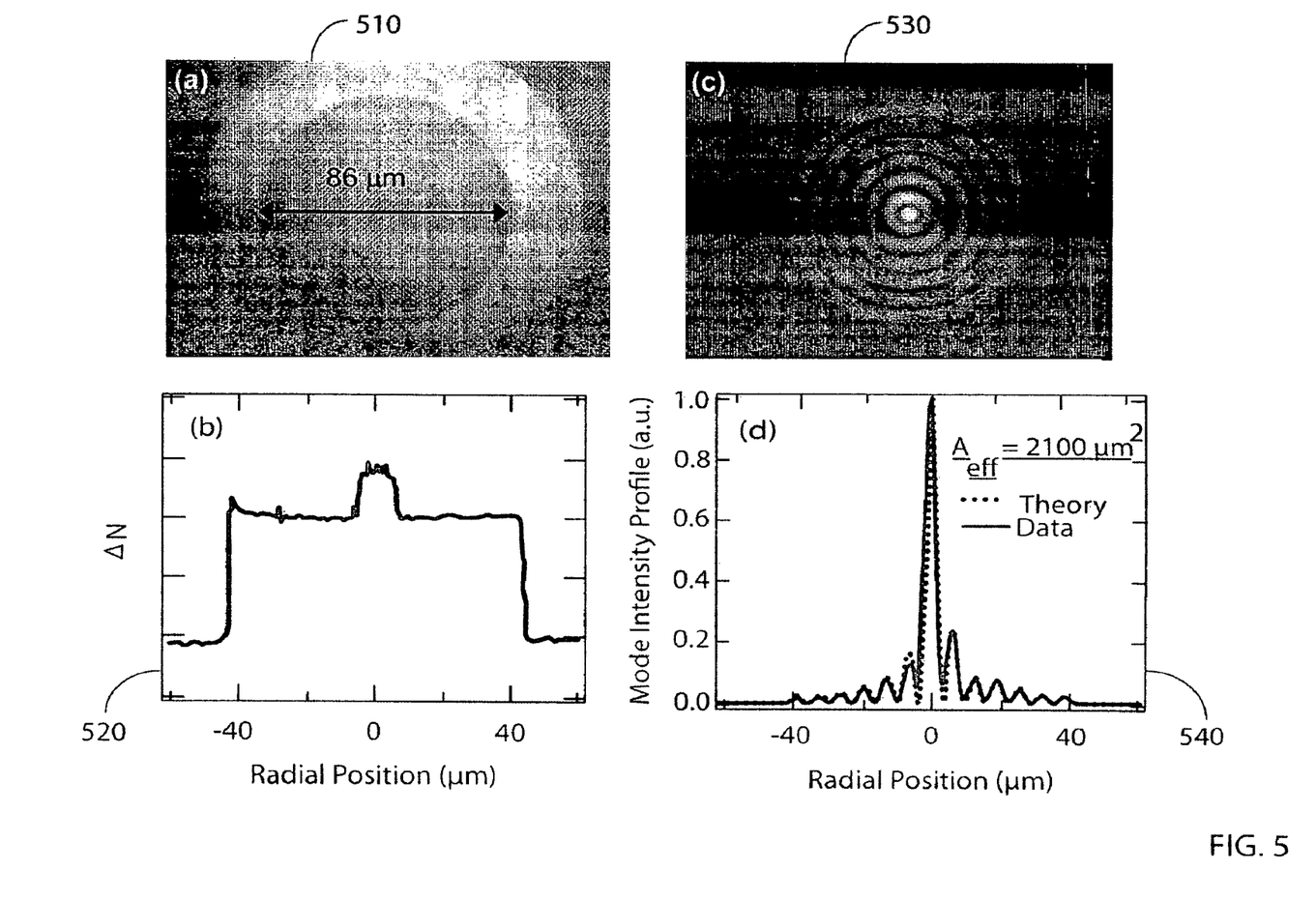
Figure 6:
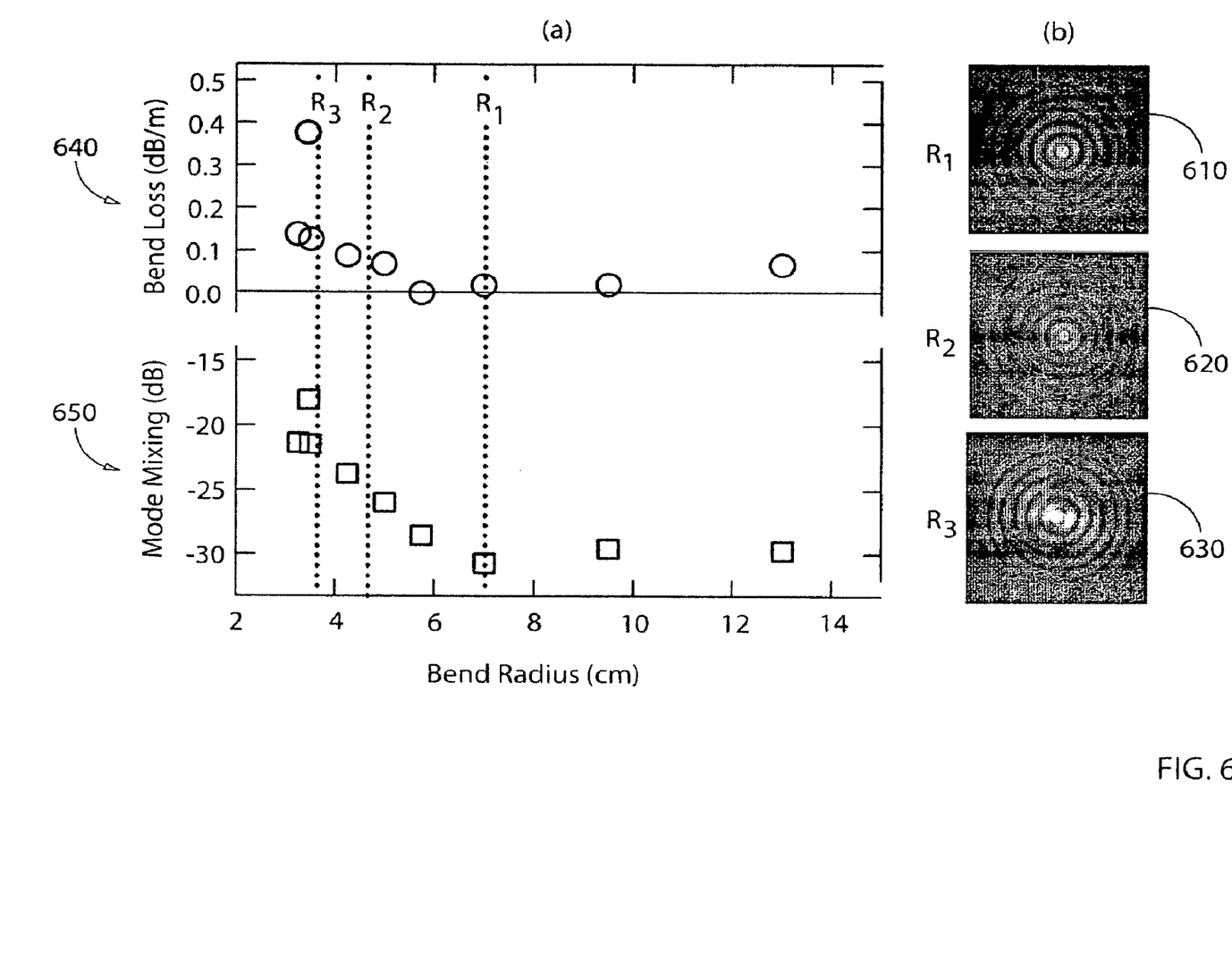
FIG. 6 is a diagram showing the effect of bend radius on bend loss and mode-mixing efficiency for several example HOM signals.

FIG. 5 shows details of a few-moded fiber that was used to obtain the modal images of FIG. 4. Specifically, FIG. 5(a) is a near-field image showing a cross-section of an example fiber having an 86-micrometer-diameter inner cladding, FIG. 5(b) is a chart showing the refractive index profile of the fiber in FIG. 5(a), and FIG. 5(c) is a diagram showing a near-field image of the $LP_{07}$ signal that propagates along the fiber of FIG. 5(a). The inner cladding, as shown in FIGS. 5(a) and 5(b), is where the HOM of FIG. 5(c) resides. FIG. 5(d) is a chart comparing the actual signal profile of FIG. 5(c) with a theoretical signal profile. The intensity line-scan of the actual signal, shown in FIG. 5(d), matches quite well with the theoretical value. The mode-intensity profiles are used to calculate the effective area of the mode, yielding, for this particular embodiment, 2140 square micrometers for the simulation, and 2075 square micrometers for the actual experimental value. Transmission in HOMs have shown stable propagation along fiber lengths that exceed 50 meters, with bend radii less than 4.5 centimeters. An example of such bend insensitivity is shown in FIGS. 6(a) and 6(b), which demonstrates that signal integrity is maintained at bend radii of approximately 7 centimeters (R1) and approximately 4.5 centimeters (R2), but shows slight distortions due to undesired coupling at a bend radius of approximately 3.8 centimeters.

The desired HOM signal is excited from a fundamental-mode signal by a mode converter or a LPG, such as that shown in FIG. 1. The signal is coupled into the single-mode-fiber (SMF) like core of the HOM fiber, such as that shown in FIG. 5(b). This coupling can be achieved with high modal purity and low loss using conventional splicing techniques. The incoming signal is converted to the desired $LP_{0m}$ mode using the LPG. Since LPGs are periodic index perturbations in the fiber, the resonant nature of the LPGs effectively couples the incoming signal to the higher-order mode. As such, when the LPG is designed to match the beat length for coupling between two co-propagating modes in a fiber, a highly efficient coupling occurs from one mode to the other. Because LPGs are reciprocal devices, the HOM signal can be converted back to the fundamental mode with an LPG that has the same structure as that which was used to convert the fundamental mode signal to the HOM signal.

Figure 2:
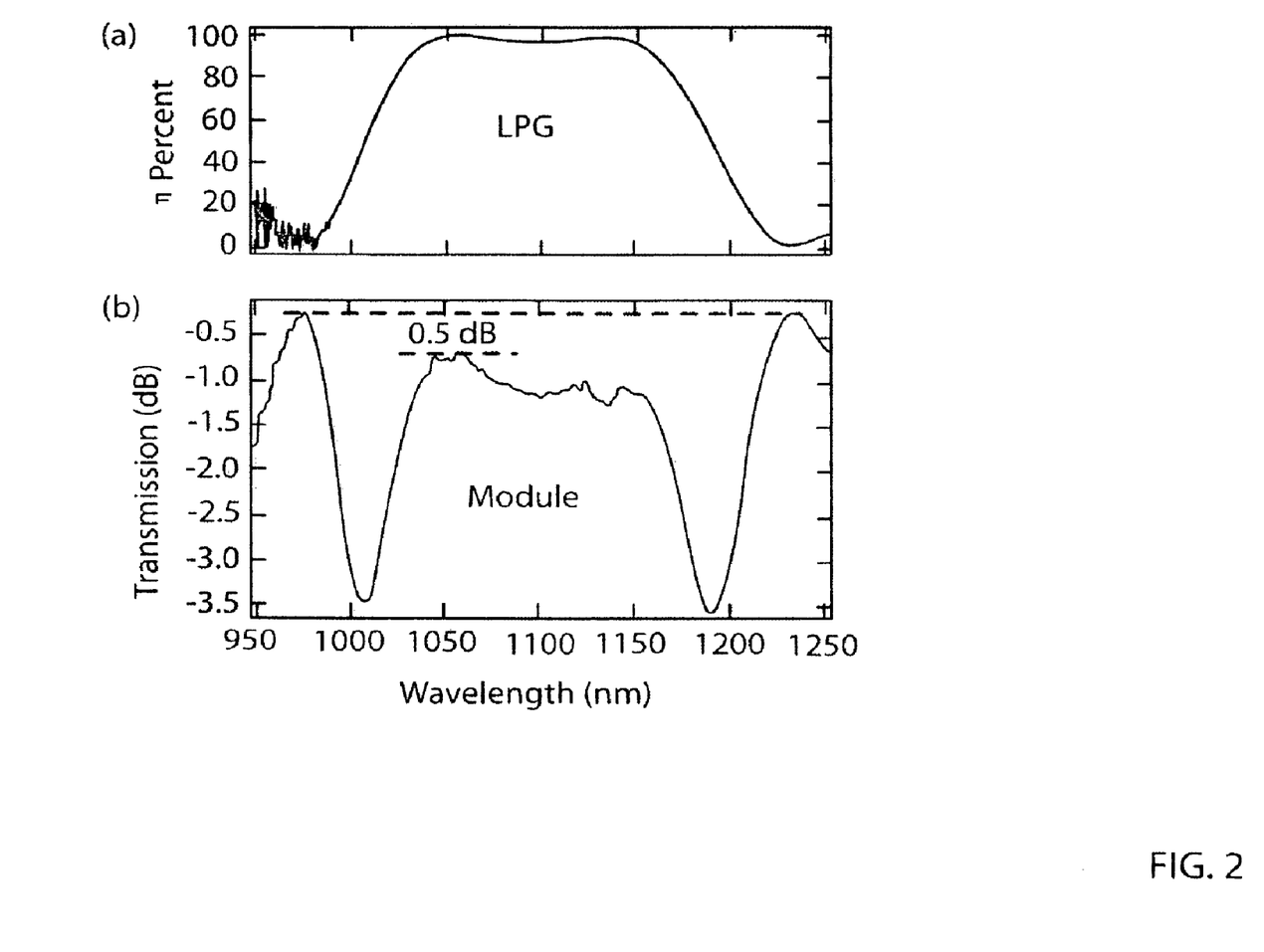

Studies have shown that the LPGs 120, 150 (FIG. 1) can efficiently operate in a wider bandwidth by matching the group velocities of the co-propagating modes. FIG. 2(a) is a chart showing an example of conversion efficiency when a fundamental mode is converted to a large-mode-area (LMA) HOM. As shown in FIG. 2(a), the conversion from the fundamental mode to the LMA HOM is greater than 99 percent, and the conversion can be achieved over bandwidths that exceed 100 nanometers.

FIG. 2(b) is a chart showing the spectral characteristics of an example module that converts fundamental mode signals to HOM signals. As shown in FIGS. 2(a) and 2(b), the broadband, efficient nature of the LPG, combined with the robust and sliceable nature of the HOM fiber, yields a device with a 1-dB bandwidth that exceeds 100 nanometers.

It should be noted that HOMs in specially-designed few-mode fibers have at least two attractive attributes in addition to modal stability. First, the choice of modal order provides a variety of achievable effective areas, examples of which were shown with reference to FIG. 4. Second, the mode typically remains tightly confined over a range of wavelengths, since the inner-cladding layer that primarily guides the HOMs is a high-index-contrast waveguide. The result is that the design is relatively independent of wavelength and, hence, the effective area remains large and fairly unaffected over a range of wavelengths. One example of this phenomenon is shown in FIGS. 3(a) and 3(b).

Figure 3:
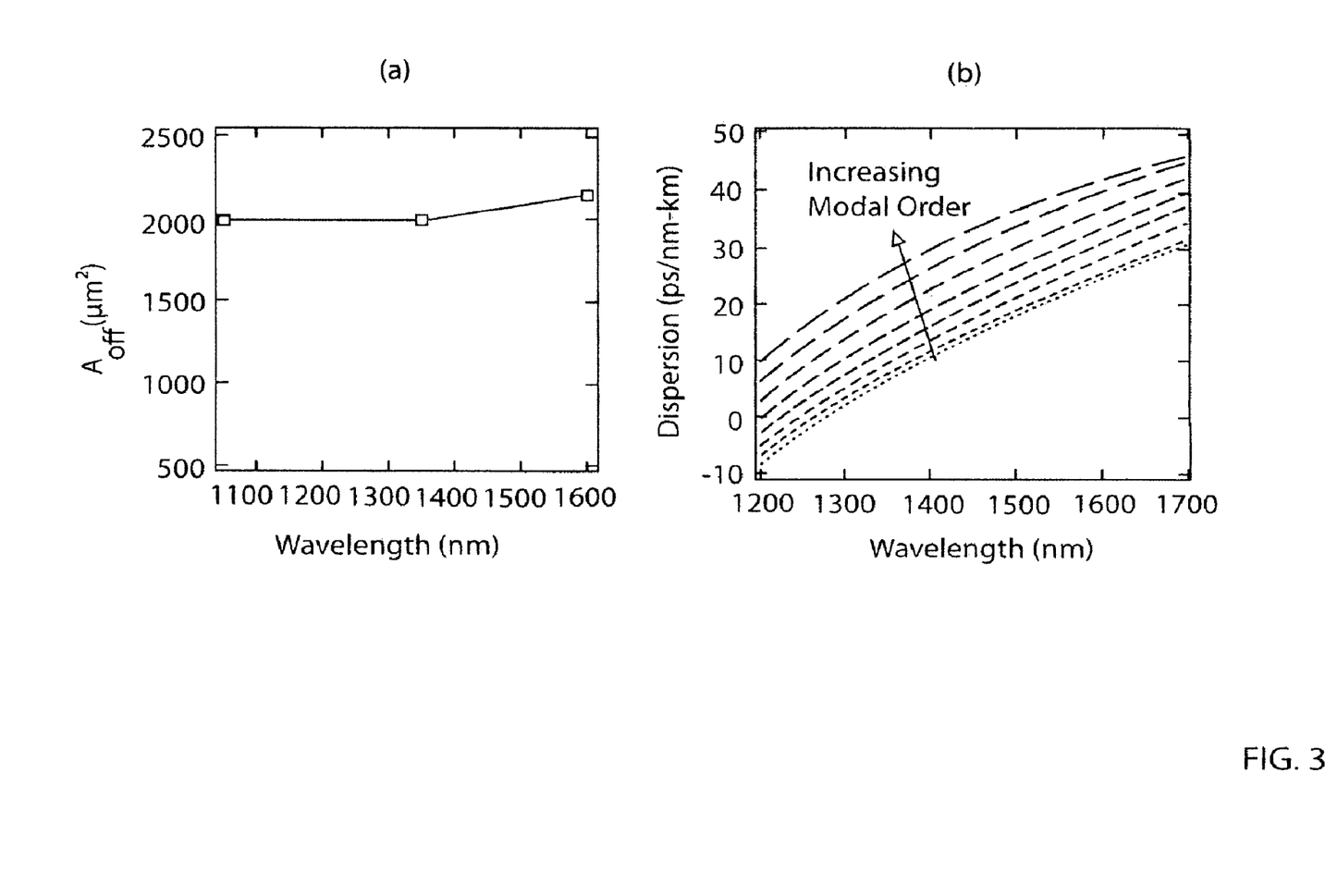

FIG. 3(a) is a chart showing the effective area of an example HOM as a function of wavelength. Particularly, FIG. 3(a) shows the effective area of the $LP_{07}$ mode in a HOM fiber. As shown in this embodiment, the effective area changes by only approximately 6 percent over a wavelength span of greater than 500 nanometers (shown here as a wavelength range from approximately 1000 nanometers to approximately 1600 nanometers). Given this relative immunity to varying wavelengths, the HOMs can be used to obtain robust, large-effective-area propagation in a wide range of technologically-important wavelengths, such as those used in high-power lasers or amplifiers.

FIG. 3(b) is a chart showing a correlation between wavelength-dependent dispersion and various example mode orders. Specifically, FIG. 3(b) shows that the tailoring of dispersion is flexible for large-effective-area HOMs. As shown in FIG. 3(b), the dispersion becomes increasingly positive with an increase in mode order. Thus, it may be possible to obtain anomalous dispersion at 1060 nanometers, which is of interest for 1060-nanometer femtosecond lasers.

Unlike fundamental modes, the HOMs have non-monotonic spatial distributions of light. In some cases, the central lobe of the HOM has a significantly-higher intensity than the surrounding rings. The intensity has only a nominal effect on many nonlinear distortions, such as, for example, stimulated Raman scattering, self-phase modulation, or nonlinearities arising from the Kerr effect in silica fibers. Instead, all of these nonlinearities are largely affected by the value of the effective area. The intuitive reason being that the spatial distribution of the intensities account for accumulated nonlinearities and, hence, the large-effective-area HOMs are more resistant to nonlinearities, as compared to the small-effective-area fundamental mode.

One particular nonlinearity that does, however, depend on local intensity, rather than on effective area, is dielectric breakdown, for which nanosecond pulses are particularly susceptible. The peak intensity differs for different modal orders, which permits specific tailoring of fiber design, depending on which nonlinearity one wishes to mitigate in a system.

Figure 7:
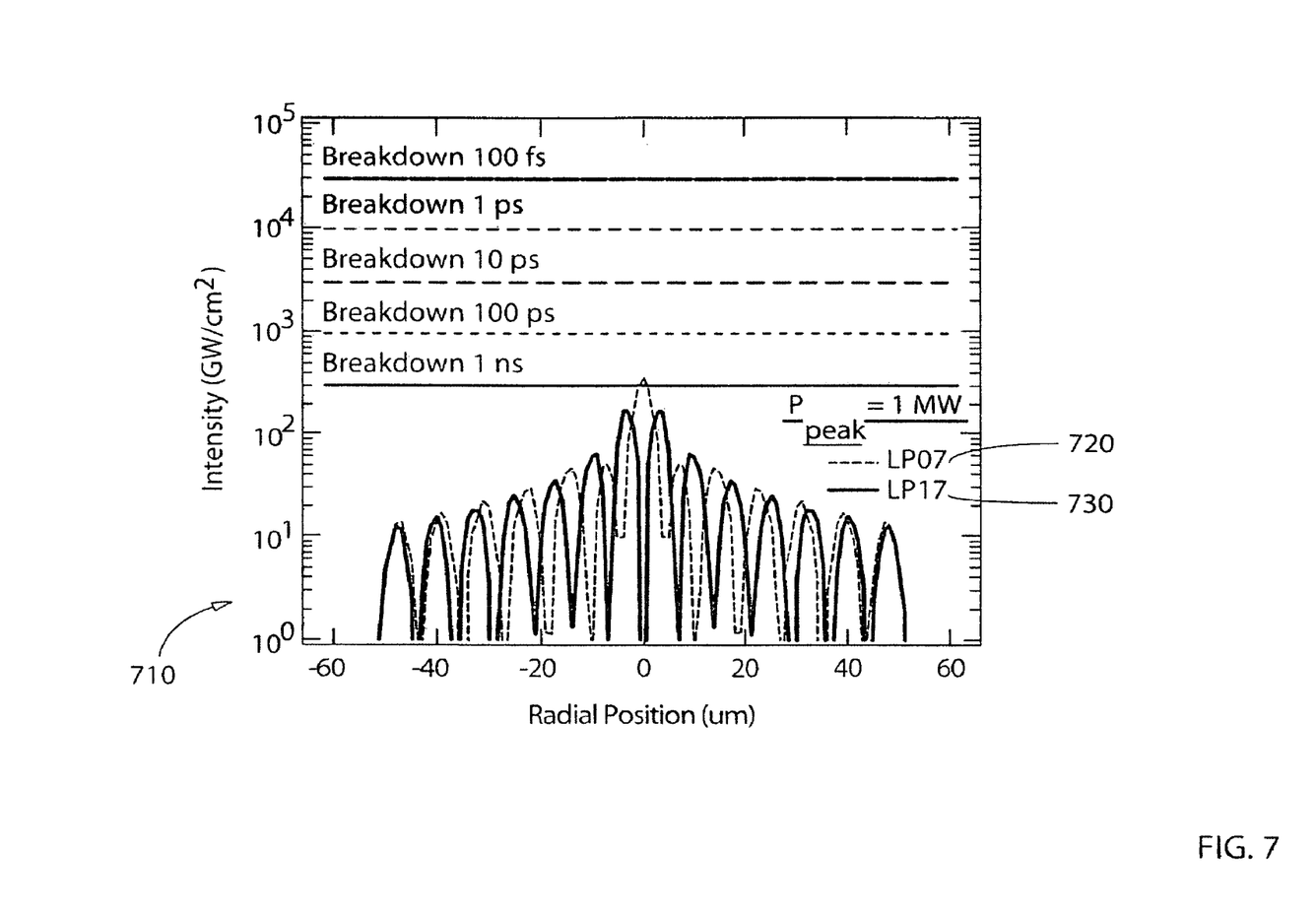
FIG. 7 is a chart showing one example of a difference in peak intensity between an even mode and an odd mode.
Figure 8:
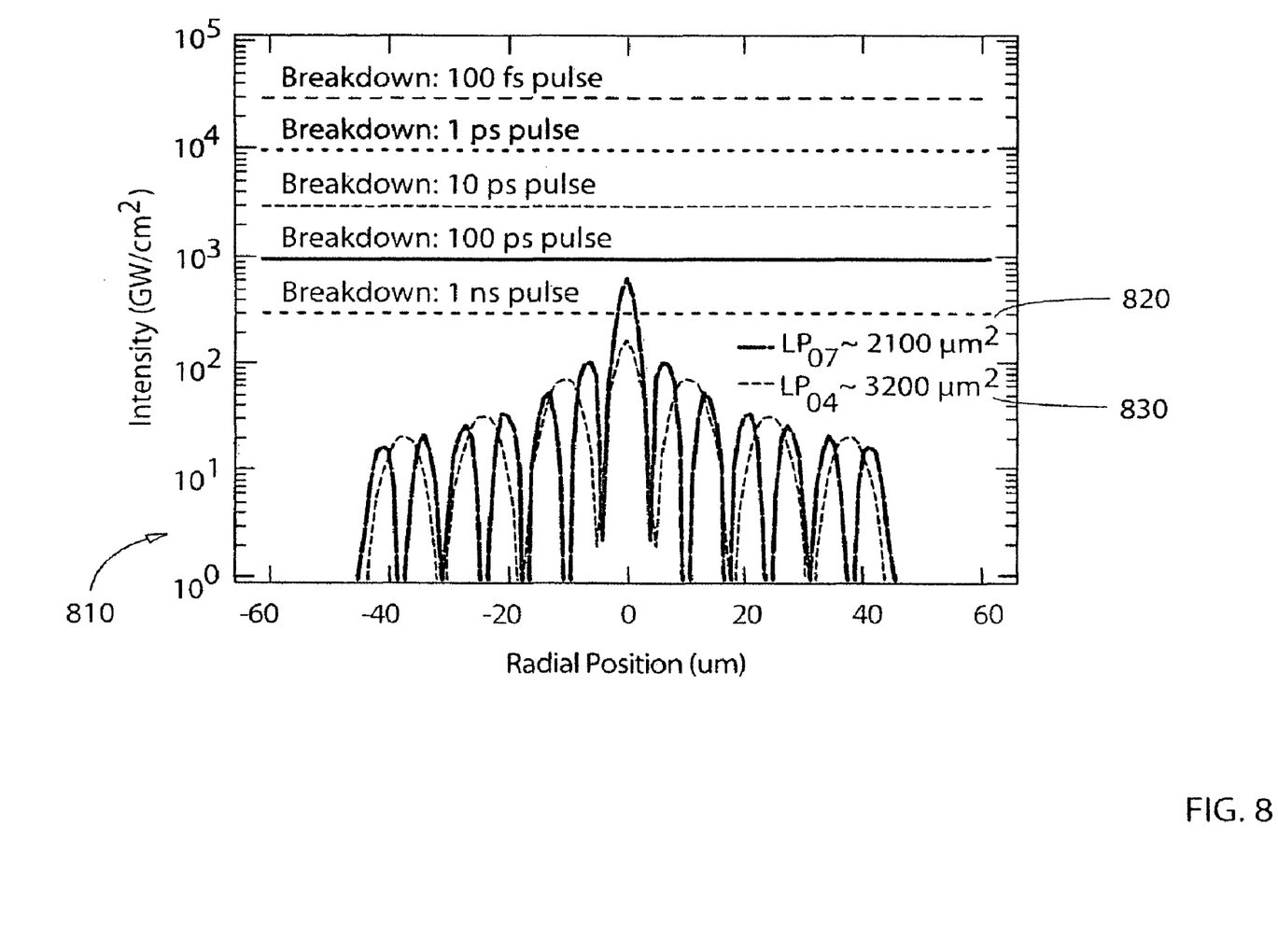
FIG. 8 is a chart showing one example of a difference in peak intensity between two different HOMs.

As discussed above, the chances of dielectric breakdown in the bulk glass can be reduced by judicious selection of the mode of transmission. In other words, since the energy distribution in the HOM profile changes with the mode order, one can calculate the peak intensity for any given HOM. Correspondingly, one can calculate whether any portion of the transmitted pulse will exceed the breakdown threshold for the optical fiber through which the HOM signal is being transmitted. Should the calculated energy exceed the dielectric breakdown threshold, another HOM with a lower peak intensity can be selected for signal transmission. FIGS. 7 and 8 show two example embodiments in which peak intensity is reduced with little change in effective area by judicious selection of HOMs.

FIG. 7 is a chart showing one example of a difference in peak intensity between an even mode and an odd mode. As shown in FIG. 7, the $LP_{07}$ mode has a central lobe that has a high intensity. In contrast, the $LP_{17}$ mode has no central lobe, since the $LP_{17}$ mode is an odd (or antisymmetric) configuration, as compared to the symmetric $LP_{07}$ mode. As one can see, by simply shifting from a symmetric to an antisymmetric configuration, the peak intensity is reduced considerably.

FIG. 8 is a chart showing one example of a difference in peak intensity between two different HOMs. In particular, FIG. 8 shows the reduction in peak intensity from $LP_{07}$ mode to $LP_{04}$ mode. As one can imagine, depending on which mode is selected for signal propagation, the peak intensity can be reduced by one or more orders of magnitude.

Dielectric breakdown damage is quantified by the threshold intensity value over which this catastrophic failure can occur in glass. There are several reported values for this in literature, given that this value depends critically on the manufacturing process by which the (silica) glass is prepared, but a useful reference value is given by B. C. Stuart, M. D. Feit, A. M. Rubenchik, B. W. Shore and M. D. Perry, "Laser-induced damage in dielectrics with nanosecond and subpicosecond pulses," *Physical Review Letters*, vol. 74, p. 2248, 1995.

The intensity value ($I_{breakdown}$) at which breakdown occurs is inversely related to the square root of the pulse width ($\tau$), where τ is given in nanoseconds (ns). In an example equation, $I_{breakdown}$ would be proportional to:

$$(300 \text{ GW/cm}^2)/(\sqrt{\tau}) \quad [\text{Eq. 1}]$$

In the case of the conventional Gaussian-shaped mode in LMA fibers, the power that a pulse carries can analytically be related to its peak intensity, since the $A_{eff}$ of the mode determines its normalized intensity. Thus, for such modes, finding a condition where dielectric breakdown is avoided simply translates to finding a mode with a large enough $A_{eff}$ so its peak intensity is lower than $I_{breakdown}$.

For the LMA-HOMs considered here, as in the case of the conventional Gaussian mode, each mode has a strict relationship with an associated peak intensity value, but no simple analytical expression exists for specifying it. Thus, here, we provide the general set of rules to determine the peak intensity of an HOM.

For an HOM, the mode is designated by $LP_{n,m}$, where n and m are integers. The case of n=0 corresponds to symmetric modes, while n=1 corresponds to anti-symmetric modes. The integer m refers to the number of intensity "nulls" in the radial direction.

Especially in the case of LMA HOMs, but more generally in the case of HOMs, the mode profile is non-monotonic, as mentioned earlier. Their profile is, to very high levels of approximation, similar to that of truncated Bessel functions, which are well known in a variety of fields of mathematics and physics. Thus, assuming that the LMA-HOMs are adequately approximated by truncated Bessel functions, a set of rules can be derived to yield the peak intensity for a given amount of pulse energy, a given mode order, and the (fiber) waveguide dimension.

Since the HOMs reside primarily in the inner cladding with dimension d (as discussed above with reference to FIG. 5), the intensity profile $I_{HOM}$ of an HOM designated as $LP_{n,m}$ may be represented as:

$$I_{HOM} = J_n(k_r \cdot r) \text{ for } r \leq d/2 \quad [\text{Eq. 2a}]$$

$$I_{HOM} = 0 \text{ for } r > d/2 \quad [\text{Eq. 2b}]$$

where $J_n$ is a Bessel function of $n^{th}$ kind. The value of the constant $k_r$ is determined from the mode order (m) of the HOM and TABLE 1, below, which shows the values for the argument of the Bessel function for which the value of the function is zero (also called zeros of the Bessel function).

As an illustration, for the $LP_{07}$ HOM residing in an inner cladding of d=86 micrometers:

$$k_r = (21.212)/(d/2) = 4.933 \times 10^3 \text{ cm}^{-1} \quad [\text{Eq. 3}]$$

TABLE 1

| m | $k_r \cdot d$ for n = 0 | $k_r \cdot d$ for n = 1 |
|---|---|---|
| 1 | 2.405 | 3.832 |
| 2 | 5.52 | 7.016 |
| 3 | 8.654 | 10.173 |
| 4 | 11.792 | 13.323 |
| 5 | 14.931 | 16.47 |
| 6 | 18.071 | 19.616 |
| 7 | 21.212 | 22.76 |
| 8 | 24.353 | 25.903 |
| 9 | 27.494 | 29.047 |

Thus, given $k_r$ (from the inner cladding dimension d) and the mode order m, the peak intensity of a given HOM, one can predict the peak intensity of the HOM as:

$$I_{peak} = (P_{peak} \cdot k_r)/(2\pi(m-0.221)) \quad [\text{Eq. 4}]$$

where $P_{peak}$ represents the peak power, and the choice of the mode order is simply governed by the relationship $I_{peak} < I_{breakdown}$.

From these examples, it should be appreciated that not only can the mode order be changed from symmetric to anti-symmetric, but it can also be changed from one symmetric HOM to another symmetric HOM. Additionally, it should be appreciated that a combination of both of these approaches can yield to further reduction in peak intensity. These and other modifications are contemplated to be within the scope of this disclosure.

Although exemplary embodiments have been shown and described, it will be clear to those of ordinary skill in the art that a number of changes, modifications, or alterations to the disclosure as described may be made. For example, while specific HOMs have been shown in the drawings and described in detail, it should be appreciated that other mode orders (in addition to those that are expressly shown) can be used to accommodate various other design parameters. All such changes, modifications, and alterations should therefore be seen as within the scope of the disclosure.

What is claimed is:

1. A system comprising:
   means for calculating a peak electric field associated with a first higher-order-mode (HOM) signal;
   means for determining whether the peak electric field of the first HOM signal exceeds a dielectric breakdown threshold of an optical fiber; and
   means for selecting a second HOM signal when the first HOM signal exceeds the dielectric breakdown threshold of the optical fiber, the second HOM signal being of substantially the same energy as the first HOM signal, the second HOM signal having a peak electric field that does not exceed the dielectric breakdown threshold of the optical fiber.

2. A system comprising:
   means for calculating a peak electric field associated with a first higher-order-mode (HOM) signal;
   means for determining whether the peak electric field of the first HOM signal exceeds a dielectric breakdown threshold of an optical fiber; and
   means for selecting a second HOM signal, the second HOM signal being of substantially the same energy as the first HOM signal, the second HOM signal having a peak electric field that does not exceed the dielectric breakdown threshold of the optical fiber.

3. In an optical fiber having a dielectric breakdown threshold, a method comprising the steps of:
   calculating a peak electric field associated with a first higher-order-mode (HOM) signal;
   determining whether the peak electric field of the first HOM signal exceeds the dielectric breakdown threshold of the optical fiber; and
   responsive to the peak electric field exceeding the dielectric breakdown threshold, selecting a second HOM signal, the second HOM signal being of substantially the same energy as the first HOM signal, the second HOM signal having a peak electric field that does not exceed the dielectric breakdown threshold of the optical fiber.

4. The method of claim 3, wherein the step of selecting the second HOM signal comprises the step of calculating the peak electric field of the second HOM signal.

5. The method of claim 3, the step of calculating the peak electric field of the HOM signals comprising the step of calculating a peak intensity ($I_{peak}$), where:

$$I_{peak}=(P_{peak} \cdot k_r)/(2\pi(m-0.221)),$$

where $P_{peak}$ represents the peak power, $k_r$ is a value related to inner cladding dimensions of the optical fiber, and m represents the mode order.

6. The method of claim 3, the step of selecting the second HOM signal comprising the step of comparing the peak electric field of the second HOM signal with the dielectric breakdown threshold.

* * * * *